US012609377B2

(12) United States Patent
Park

(10) Patent No.: US 12,609,377 B2
(45) Date of Patent: Apr. 21, 2026

(54) BATTERY MODULE

(71) Applicant: E-TESS.CO., LTD, Bucheon-si (KR)

(72) Inventor: Sunwoo Park, Incheon (KR)

(73) Assignee: E-TESS.CO., LTD, Bucheon-si (KR)

( * ) Notice: Subject to any disclaimer, the term of this patent is extended or adjusted under 35 U.S.C. 154(b) by 512 days.

(21) Appl. No.: 18/026,744

(22) PCT Filed: Sep. 7, 2021

(86) PCT No.: PCT/KR2021/012143
    § 371 (c)(1),
    (2) Date: Mar. 16, 2023

(87) PCT Pub. No.: WO2022/075606
    PCT Pub. Date: Apr. 14, 2022

(65) Prior Publication Data
    US 2023/0344035 A1      Oct. 26, 2023

(30) Foreign Application Priority Data

Oct. 5, 2020    (KR) ........................ 10-2020-0128143

(51) Int. Cl.
    *H01M 10/6567*      (2014.01)
    *H01M 50/213*      (2021.01)
    *H01M 50/505*      (2021.01)
(52) U.S. Cl.
    CPC ..... *H01M 10/6567* (2015.04); *H01M 50/213* (2021.01); *H01M 50/505* (2021.01)
(58) Field of Classification Search
    CPC .......... H01M 10/6567; H01M 50/505; H01M 50/213

(Continued)

(56) References Cited

U.S. PATENT DOCUMENTS

| | | | | | |
|---|---|---|---|---|---|
| 2013/0153183 | A1* | 6/2013 | Velan | ........................ | F28F 9/00 |
| | | | | | 165/164 |
| 2018/0277808 | A1* | 9/2018 | Kruszelnicki | ..... | H01M 10/6568 |
| 2020/0127350 | A1* | 4/2020 | Lee | ..................... | H01M 10/613 |

FOREIGN PATENT DOCUMENTS

| | | | |
|---|---|---|---|
| KR | 10-2006-0060808 A | 6/2006 |
| KR | 10-2011-0047614 A | 5/2011 |

(Continued)

*Primary Examiner* — Sadie White
*Assistant Examiner* — Robert Gene West
(74) *Attorney, Agent, or Firm* — Bridgeway IP Law Group, PLLC; Sang Ho Lee; Hyun Woo Shin

(57) ABSTRACT

A battery module may include a heat exchanger including a lower wall having a plurality of first through-holes, an upper wall having a plurality of second through-holes corresponding to the plurality of first through-holes, a plurality of pipe members configured to connect the plurality of first through-holes and the plurality of second through-holes in a one-to-one manner, and a plurality of sidewalls configured to connect the lower wall and the upper wall to define a flow space for a heat exchange medium that adjoins the plurality of pipe members, in which a first sidewall, among the plurality of sidewalls, has an inlet port into which the heat exchange medium is introduced, and a second sidewall, among the plurality of sidewalls, has an outlet port from which the heat exchange medium is discharged, a plurality of battery cells respectively inserted into the plurality of pipe members, a first busbar assembly coupled to a lower portion of the heat exchanger and configured to support the plurality of battery cells, the first busbar assembly having a plurality of first terminals being in contact with lower end electrodes of the plurality of battery cells, and a second busbar assembly coupled to an upper portion of the heat exchanger and having a plurality of second terminals being in contact with upper end electrodes of the plurality of battery cells.

7 Claims, 10 Drawing Sheets

(58) Field of Classification Search
    USPC .......................................................... 429/83
    See application file for complete search history.

(56)                    References Cited

FOREIGN PATENT DOCUMENTS

| KR | 10-2017-0049654 | A  | 5/2017 |
|----|-----------------|----|--------|
| KR | 10-2017-0051817 | A  | 5/2017 |
| KR | 10-1953351      | B1 | 3/2019 |
| KR | 10-2020-0097236 | A  | 8/2020 |

\* cited by examiner

10

BATTERY MODULE

TECHNICAL FIELD

The present disclosure relates to a battery module, and more particularly, to a battery module having a heat exchanger configured to cool or heat a plurality of battery cells provided in the battery module.

BACKGROUND ART

Fossil energy, which has been used as energy sources for various types of devices such as vehicles and motorcycles and industrial facilities, is gradually being replaced with electrical energy to solve the problem of resource depletion or environmental pollution.

For example, an electric vehicle means a vehicle that uses electrical energy as an energy source.

In general, the electric vehicle is equipped with a rechargeable battery that supplies electrical energy to a wheel driving motor. That is, the battery includes a secondary battery cell that is chargeable and dischargeable. In this case, energy efficiency of the secondary battery cell may be affected by a temperature. Accordingly, there is a need for a measure to maintain a temperature of the secondary battery cell at an appropriate level.

DOCUMENT OF RELATED ART (Patent Document 1) Korean Patent No. 10-1953351 (Mar. 4, 2019, entitled Contactless Battery Module and Battery Module Assembly Using the Same)

DISCLOSURE

Technical Problem

An embodiment of the present disclosure provides a battery module having a heat exchanger configured to cool or heat a plurality of battery cells.

Technical Solution

According to an aspect of the present disclosure, there may be provided a battery module including: a heat exchanger including a lower wall having a plurality of first through-holes, an upper wall having a plurality of second through-holes corresponding to the plurality of first through-holes, a plurality of pipe members configured to connect the plurality of first through-holes and the plurality of second through-holes in a one-to-one manner, and a plurality of sidewalls configured to connect the lower wall and the upper wall to define a flow space for a heat exchange medium that adjoins the plurality of pipe members, in which a first sidewall, among the plurality of sidewalls, has an inlet port into which the heat exchange medium is introduced, and a second sidewall, among the plurality of sidewalls, has an outlet port from which the heat exchange medium is discharged; a plurality of battery cells respectively inserted into the plurality of pipe members; a first busbar assembly coupled to a lower portion of the heat exchanger and configured to support the plurality of battery cells, the first busbar assembly having a plurality of first terminals being in contact with lower end electrodes of the plurality of battery cells; and a second busbar assembly coupled to an upper portion of the heat exchanger and having a plurality of second terminals being in contact with upper end electrodes of the plurality of battery cells.

The pipe member may extend perpendicularly to the lower wall and the upper wall.

An internal space of the pipe member may be isolated from the flow space for the heat exchange medium.

The first sidewall and the second sidewall may be disposed to face each other.

The heat exchanger may further include: a first connector connected to the inlet port; and a second connector connected to the outlet port, and the second connector may have a structure capable of being coupled to the first connector.

The first connector may have a plate shape attached to an outer surface of the first sidewall, a coupling hole may be formed in the first connector and connected to the inlet port, and the second connector may have a pipe shape attached to an outer surface of the second sidewall and configured to be capable of being inserted into the coupling hole and the inlet port.

A seating groove having a polygonal cross-sectional shape may be formed in an outer surface of the first connector, the coupling hole may be disposed in the seating groove, and the second connector may include: a polyprismatic portion seated in the seating groove; and an insertion portion extending from the polyprismatic portion and inserted into the coupling hole.

A sealing member may be coupled to an inner peripheral surface of the coupling hole.

The first busbar assembly may include: a base plate having the plurality of first terminals; and a first battery cell support member disposed on the base plate and having a plurality of third through-holes into which the plurality of battery cells is inserted.

The second busbar assembly may include: a second battery cell support member having a plurality of fourth through-holes into which the plurality of battery cells is inserted; and a cover plate disposed on the second battery cell support member and having the plurality of second terminals.

Advantageous Effects

According to the embodiment of the present disclosure, the plurality of battery cells is cooled or heated by heat exchange with the heat exchange medium supplied to the heat exchanger, such that a temperature of the plurality of battery cells may be maintained at an appropriate level.

In addition, the plurality of battery modules may be extended horizontally by being connected to one another by the male connectors and the female connectors respectively installed in the inlet ports and the outlet ports of the heat exchangers.

MODE FOR DISCLOSURE

Hereinafter, embodiments of the present disclosure will be described with reference to the accompanying drawings.

Unless otherwise explicitly defined and stated as other meanings, the terms used in the embodiments of the present disclosure may be construed as the meaning which may be commonly understood by the person with ordinary skill in the art to which the present disclosure pertains. The terms are exemplified only for the purpose of explaining particular embodiments and not intended to limit the present disclosure.

Unless particularly stated otherwise in the present specification, a singular form also includes a plural form.

In addition, when one constituent element is described as being "connected" or "coupled" to another constituent element, it should be understood that one constituent element can be connected or coupled indirectly to another constituent element by means of an intervening constituent element.

In addition, the terms first, second, and the like may be used to describe constituent elements. These terms are used only for the purpose of discriminating one constituent element from another constituent element, and the nature, the sequences, or the orders of the constituent elements are not limited by the terms.

Figure 1:
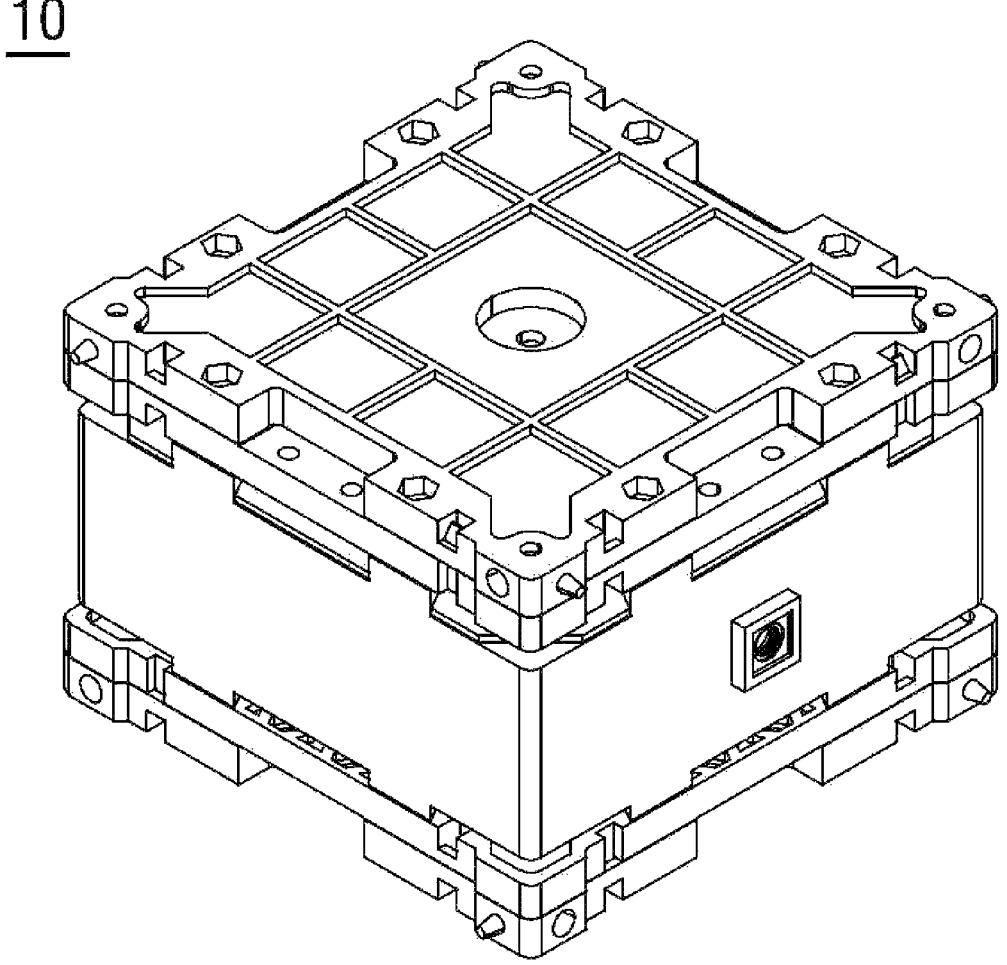
FIG. 1 is a perspective view of a battery module according to an embodiment of the present disclosure.
Figure 2:
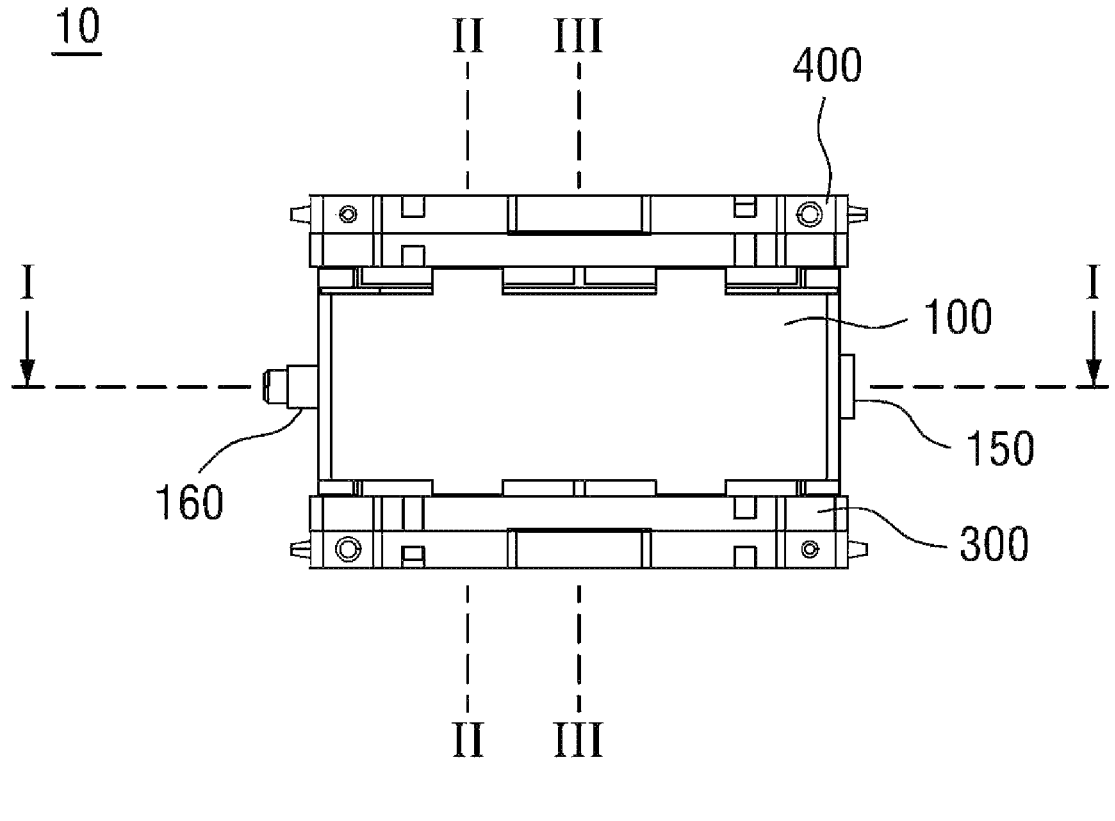
FIG. 2 is an exploded perspective view of FIG. 1.

FIG. 1 is a perspective view of a battery module according to an embodiment of the present disclosure, and FIG. 2 is an exploded perspective view of FIG. 1.

With reference to FIGS. 1 and 2, a battery module 10 according to an embodiment of the present disclosure may include a heat exchanger 100, a plurality of battery cells 200, a first busbar assembly 300, and a second busbar assembly 400.

The heat exchanger 100 may cool or heat the plurality of battery cells 200 by using a heat exchange medium, e.g., water or a fluid.

The plurality of battery cells 200 may be inserted into a plurality of through-holes formed through the heat exchanger 100 in an upward/downward direction.

The first busbar assembly 300 and the second busbar assembly 400 are respectively coupled to upper and lower portions of the heat exchanger 100 and electrically connected to the plurality of battery cells 200.

Figure 3:
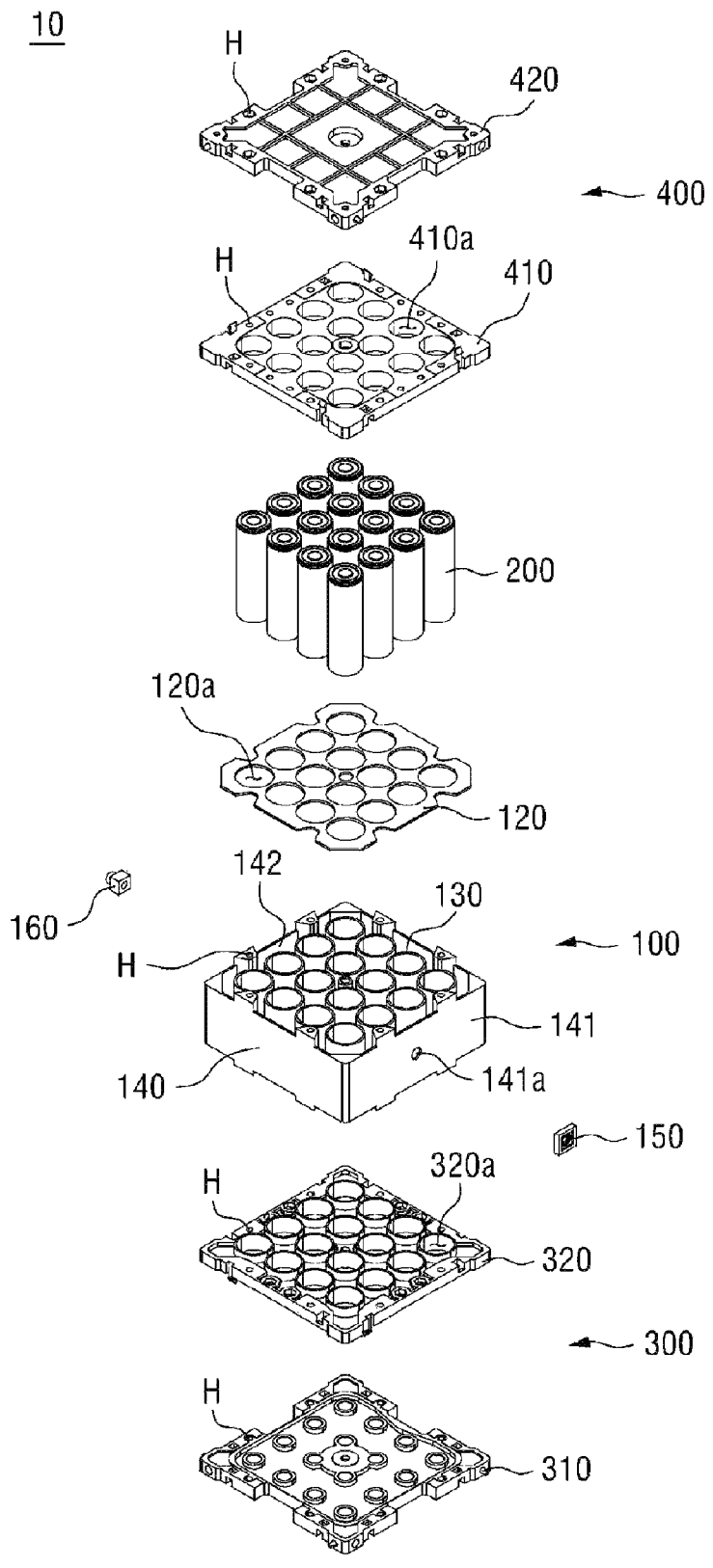
FIG. 3 is a front view of FIG. 1.
Figure 4:
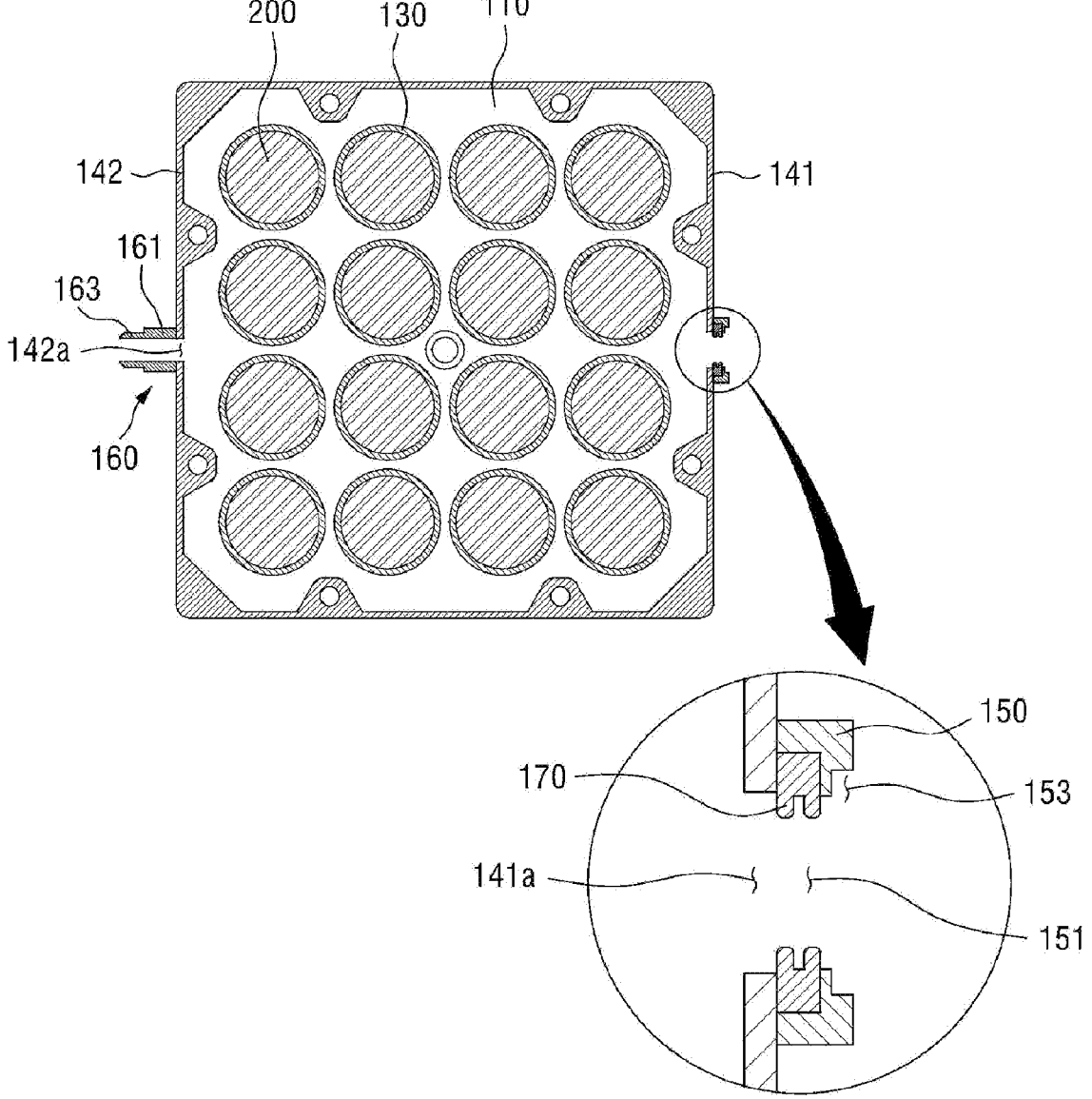
FIG. 4 is a cross-sectional view taken along line I-I in FIG. 3.
Figure 5:
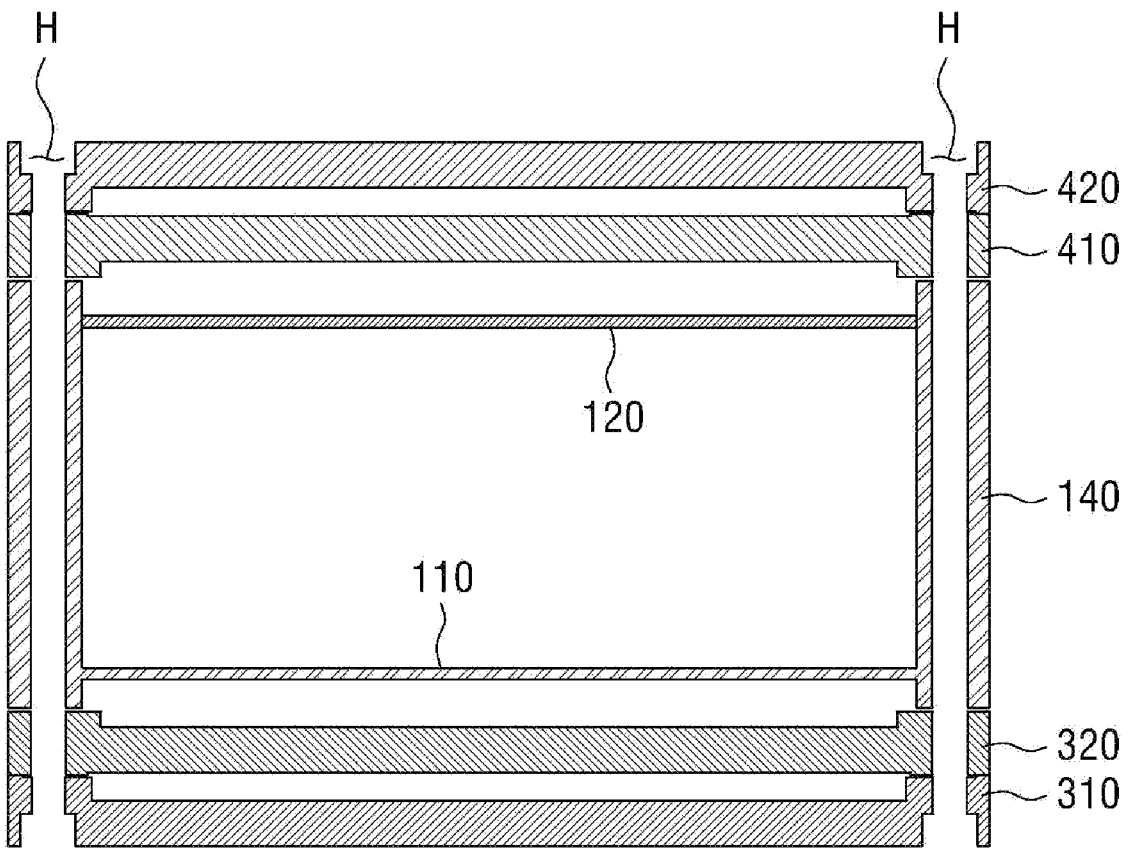
FIG. 5 is a cross-sectional view taken along line II-II in FIG. 3.
Figure 6:
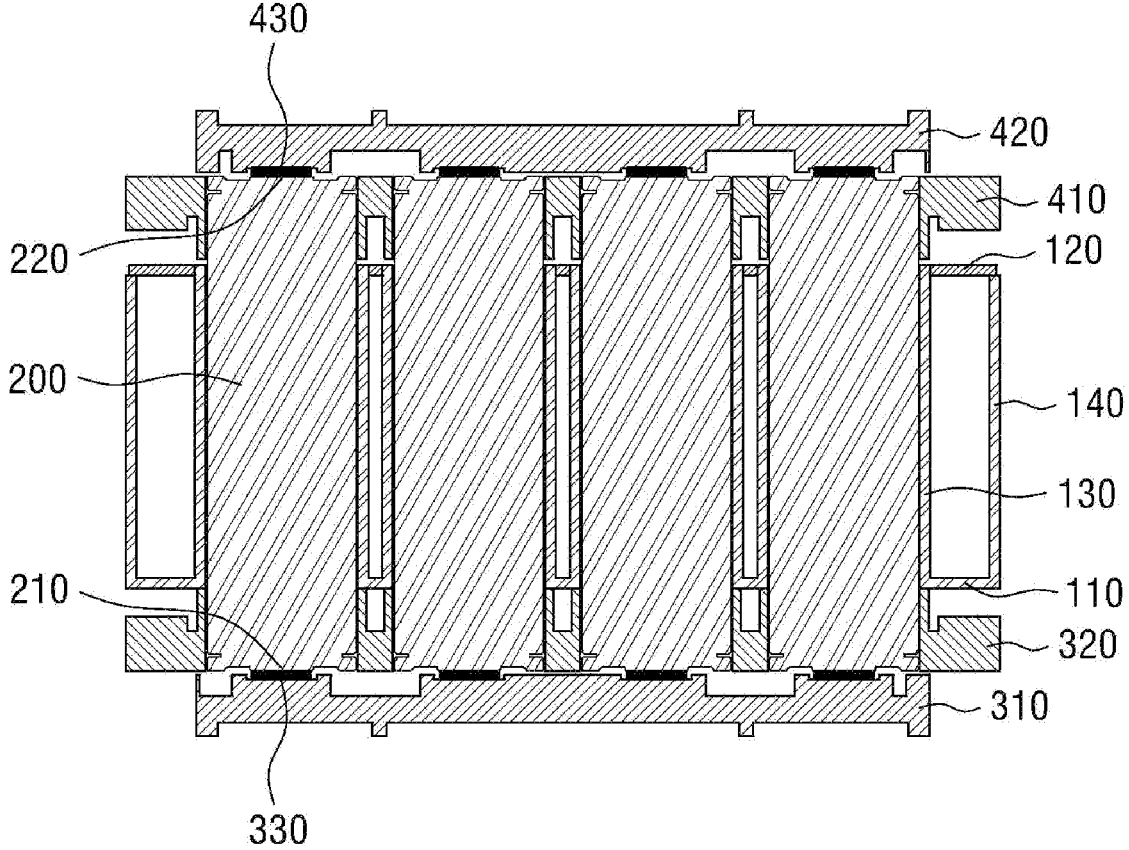
FIG. 6 is a cross-sectional view taken along line III-III in FIG. 3.
Figure 7:
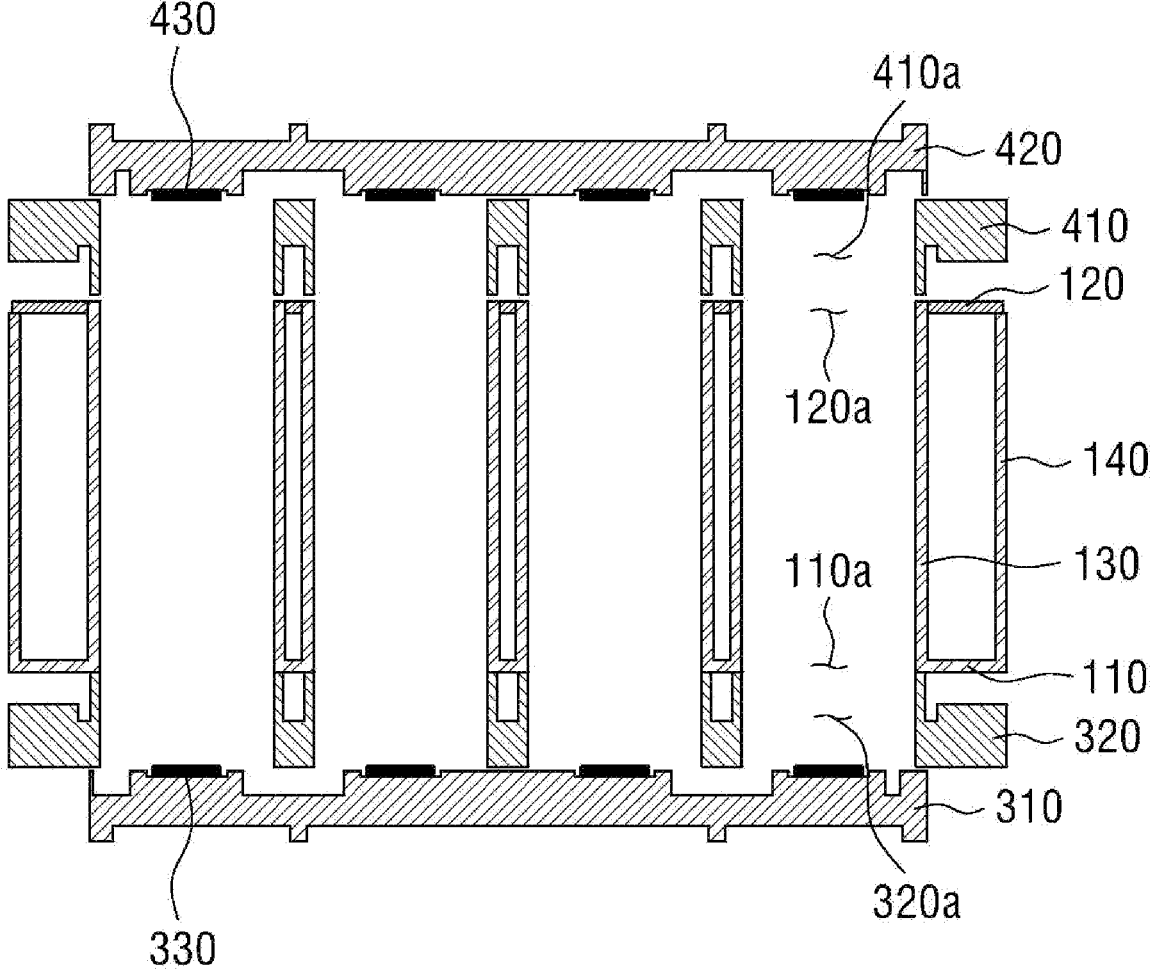
FIG. 7 is a view illustrating a state in which a battery cell in FIG. 6 is excluded.

FIG. 3 is a front view of FIG. 1, FIG. 4 is a cross-sectional view taken along line I-I in FIG. 3, FIG. 5 is a cross-sectional view taken along line II-II in FIG. 3, FIG. 6 is a cross-sectional view taken along line III-III in FIG. 3, and FIG. 7 is a view illustrating a state in which a battery cell in FIG. 6 is excluded.

With reference to FIGS. 3 to 7, the heat exchanger 100 may include a lower wall 110, an upper wall 120, a plurality of pipe members 130, and a plurality of sidewalls 140 and further include a first connector 150 and a second connector 160.

The lower wall 110 may have a plurality of first through-holes 110a. The upper wall 120 may have a plurality of second through-holes 120a disposed at positions corresponding to the plurality of first through-holes 110a.

The upper wall 120 may be separably seated on the plurality of sidewalls 140 and brought into close contact with the plurality of sidewalls 140 by the second busbar assembly 400. However, the present disclosure is not limited thereto.

The plurality of pipe members 130 may connect the plurality of first through-holes 110a and the plurality of second through-holes 120a in a one-to-one manner.

For example, the pipe member 130 may extend upward from the lower wall 110 and be inserted into the second through-hole 120a, and particularly, the pipe member 130 may extend perpendicularly to the lower wall 110 and the upper wall 120.

Therefore, internal spaces of the pipe members 130 may be isolated from a flow space for the heat exchange medium that is defined by the lower wall 110, the upper wall 120, and the plurality of sidewalls 140.

The plurality of sidewalls 140 may each connect the lower wall 110 and the upper wall 120 and define the flow space for the heat exchange medium that is disposed between the lower wall 110 and the upper wall 120 and adjoins the plurality of pipe members 130.

Among the plurality of sidewalls 140, a first sidewall 141 may have an inlet port 141a which is a passageway through which the heat exchange medium is introduced into the flow space for the heat exchange medium. Among the plurality of sidewalls 140, a second sidewall 142 may have an outlet port 142a which is a passageway through which the heat exchange medium in the flow space for the heat exchange medium is discharged to the outside.

The first sidewall 141 and the second sidewall 142 may be disposed to face each other.

The first connector 150 may be coupled to the first sidewall 141 and connected to the inlet port 141a.

The first connector 150 may have a plate shape attached to an outer surface of the first sidewall 141. A coupling hole 151 is formed in the first connector 150 and connected to the inlet port 141a.

In addition, a seating groove 153 may be formed in an outer surface of the first connector 150 and have a polygonal cross-sectional shape. In this case, the coupling hole 151 may be disposed in the seating groove 153.

The second connector 160 may be coupled to the second sidewall 142 and connected to the outlet port 142a.

The second connector 160 may have a structure capable of being separably coupled to the first connector 150.

The second connector 160 may have a pipe shape attached to an outer surface of the second sidewall 142 and be configured to be inserted into the coupling hole 151 and the inlet port 141a.

Specifically, the second connector 160 may include: a polyprismatic portion 161 having a polygonal cross-sectional shape corresponding to the seating groove 153 so as to be seated in the seating groove 153; and an insertion portion 163 extending from the polyprismatic portion 161 and configured to be inserted into the coupling hole 151 and the inlet port 141a.

In addition, a sealing member 170 may be coupled to an inner peripheral surface of the coupling hole 151 and configured to come into close contact with the insertion portion 163, thereby improving sealability between the first connector 150 and the second connector 160.

The plurality of battery cells 200 may be respectively inserted into the internal spaces of the plurality of pipe members 130.

The battery cell 200 may be a chargeable and dischargeable secondary battery. The battery cell 200 may have a lower end electrode 210 provided at a lower end of the battery cell 200, and an upper end electrode 220 provided at an upper end of the battery cell 200.

The first busbar assembly 300 may be coupled to a lower portion of the heat exchanger 100 and support the plurality of battery cells 200. The first busbar assembly 300 may have a plurality of first terminals 330 that are in contact with the lower end electrodes 210 of the plurality of battery cells 200.

The first busbar assembly 300 may include a base plate 310 and a first battery cell support member 320.

The base plate 310 may support the plurality of battery cells 200, and the plurality of first terminals 330 may be provided on the base plate 310.

The first battery cell support member 320 may be disposed on the base plate 310 and have a plurality of third through-holes 320_a_ into which the plurality of battery cells 200 is inserted. The plurality of third through-holes 320_a_ may be disposed at positions corresponding to the plurality of first through-holes 110_a_. Therefore, the first battery cell support member 320 may support lower portions of outer surfaces of the plurality of battery cells 200.

The second busbar assembly 400 may be coupled to an upper portion of the heat exchanger 100 and have a plurality of second terminals 430 that are in contact with the upper end electrodes 220 of the plurality of battery cells 200.

The second busbar assembly 400 may include a second battery cell support member 410 and a cover plate 420.

The second battery cell support member 410 may be disposed on the heat exchanger 100 and have a plurality of fourth through-holes 410_a_ into which the plurality of battery cells 200 is inserted. The plurality of fourth through-holes 410_a_ may be disposed at positions corresponding to the plurality of second through-holes 120_a_. Therefore, the second battery cell support member 410 may support upper portions of outer surfaces of the plurality of battery cells 200.

The cover plate 420 may be disposed on the second battery cell support member 410, and the plurality of second terminals 430 may be provided on a lower portion of the cover plate 420.

The first busbar assembly 300 and the second busbar assembly 400 may be separably coupled to the heat exchanger 100 through fastening members (not illustrated) such as bolts. To this end, bolt fastening holes H may be formed at corresponding positions on the heat exchanger 100, the base plate 310, and the first battery cell support member 320. Bolt fastening holes H may also be formed at corresponding positions on the heat exchanger 100, the second battery cell support member 410, and the cover plate 420.

Figure 8:
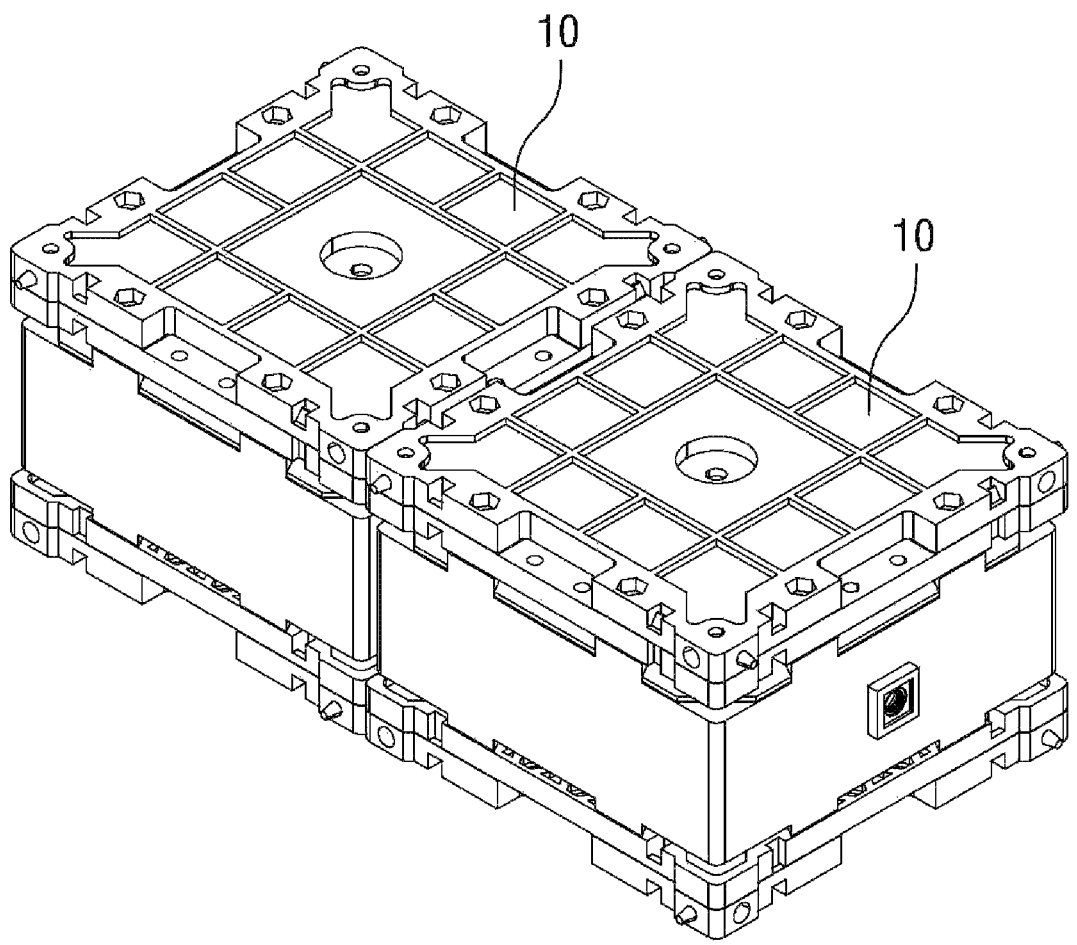
FIG. 8 is a view illustrating an example in which the battery modules in FIG. 1 are extended horizontally.
Figure 9:
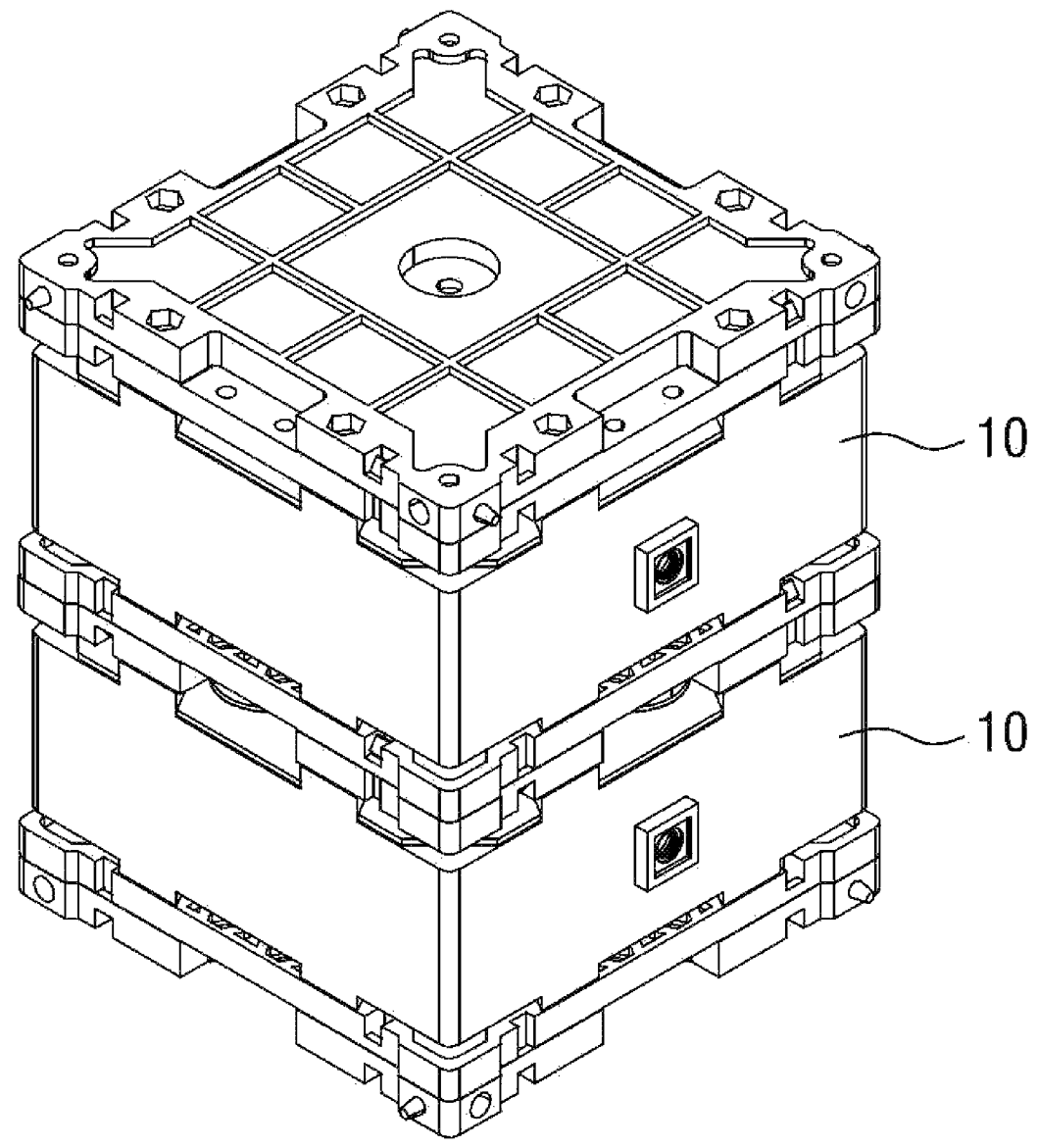
FIG. 9 is a view illustrating an example in which the battery modules in FIG. 1 are extended vertically.
Figure 10:
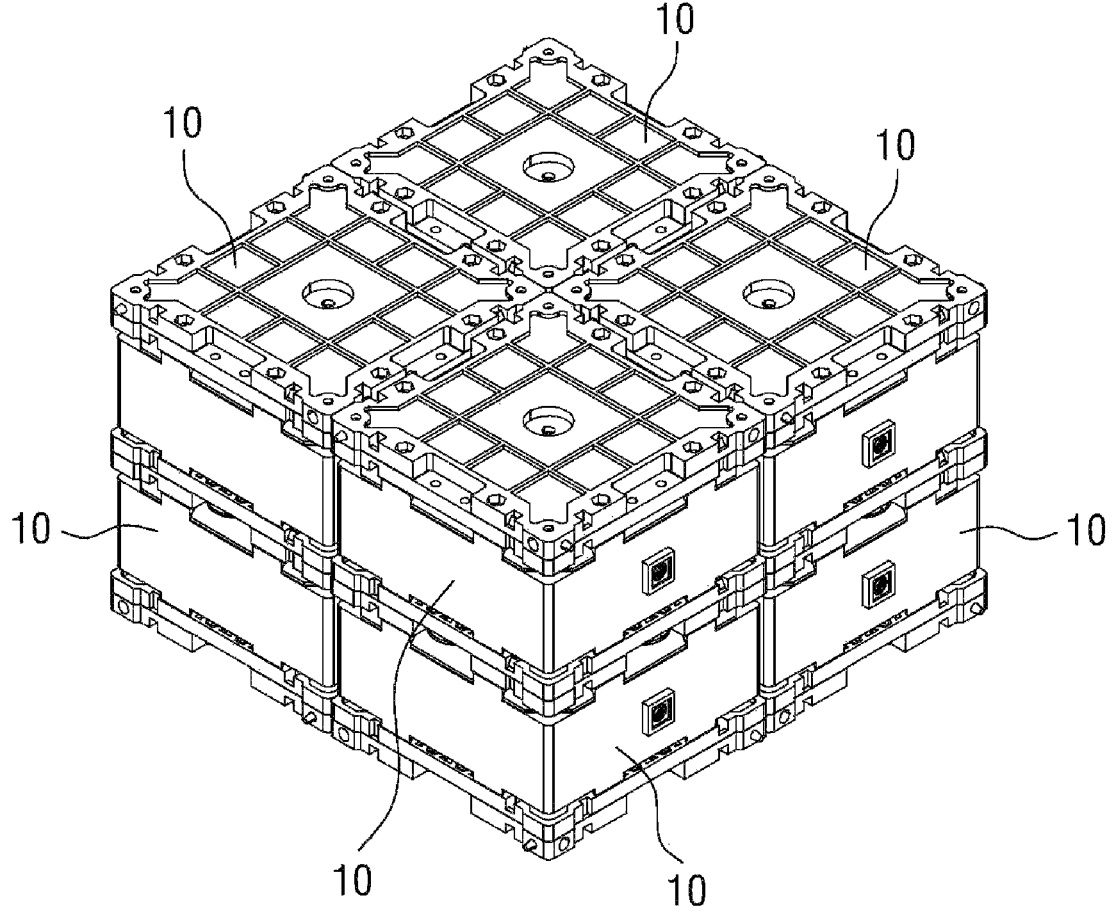
FIG. 10 is a view illustrating an example in which the battery modules in FIG. 1 are extended horizontally and vertically.

FIG. 8 is a view illustrating an example in which the battery modules in FIG. 1 are extended horizontally, FIG. 9 is a view illustrating an example in which the battery modules in FIG. 1 are extended vertically, and FIG. 10 is a view illustrating an example in which the battery modules in FIG. 1 are extended horizontally and vertically.

With reference to FIGS. 8 to 10, the plurality of battery modules 10 may be extended in a horizontal direction and/or a vertical direction.

In case that the plurality of battery modules 10 is extended horizontally, the plurality of battery modules 10 may be connected to one another through the first connector 150 and the second connector 160.

In case that the plurality of battery modules 10 is extended vertically, the plurality of battery modules 10 may be stacked on one another. In this case, the base plate 310 and the cover plate 420 may be excluded from the first busbar assembly 300 and the second busbar assembly 400 disposed between the pair of heat exchangers 100, such that the battery cell 200 disposed at the upper side may be in direct contact with and electrically connected to the battery cell 200 disposed at the lower side.

While the exemplary embodiments of the present disclosure have been described above, the exemplary embodiments are just illustrative and not intended to limit the present disclosure. Those skilled in the art to which the present disclosure pertains may variously modify and change the embodiment by adding, changing, deleting, or modifying constituent elements without departing from the technical spirit of the present disclosure disclosed in the claims, and the modification and change also belong to the scope of the present disclosure.

DESCRIPTION OF REFERENCE NUMERALS

| | |
|---|---|
| 10: Battery module | 100: Heat exchanger |
| 110: Lower wall | 110a: First through-hole |
| 120: Upper wall | 120a: Second through-hole |
| 130: Pipe member | 140: Sidewall |
| 141: First sidewall | 141a: Inlet port |
| 142: Second sidewall | 142a: Outlet port |
| 150: First connector | 151: Coupling hole |
| 153: Seating groove | 160: Second connector |
| 161: Polyprismatic portion | 163: Insertion portion |
| 170: Sealing member | 200: Battery cell |
| 210: Lower end electrode | 220: Upper end electrode |
| 300: First busbar assembly | 310: Base plate |
| 320: First battery cell support member | 320a: Third through-hole |
| 330: First terminal | 400: Second busbar assembly |
| 410: Second battery cell support member | 410a: Fourth through-hole |
| 420: Cover plate | 430: Second terminal |

The invention claimed is:

1. A battery module comprising:
a heat exchanger including:
    a first wall having a plurality of first through-holes,
    a second wall having a plurality of second through-holes corresponding to the plurality of first through-holes,
    a plurality of pipe members configured to connect the plurality of first through-holes and the plurality of second through-holes in a one-to-one manner,
    a plurality of sidewalls configured to connect the first wall and the second wall to define a flow space for a heat exchange medium that adjoins the plurality of pipe members, wherein a first sidewall, among the plurality of sidewalls, has an inlet port into which the heat exchange medium is introduced, and a second sidewall, among the plurality of sidewalls, has an outlet port from which the heat exchange medium is discharged,
    a first connector connected to the inlet port and having a plate shape attached to an outer surface of the first sidewall, and
    a second connector connected to the outlet port and having a structure configured to be coupled to the first connector;
a plurality of battery cells respectively inserted into the plurality of pipe members;
a first busbar assembly coupled to a lower portion of the heat exchanger and configured to support the plurality of battery cells, the first busbar assembly having a plurality of first terminals being in contact with lower end electrodes of the plurality of battery cells; and a second busbar assembly coupled to an upper portion of the heat exchanger and having a plurality of second terminals being in contact with upper end electrodes of the plurality of battery cells, wherein a coupling hole is defined in the first connector and connected to the inlet port, wherein the second connector has a pipe shape attached to an outer surface of the second sidewall and configured to be inserted into the coupling hole and the inlet port, wherein a seating groove having a polygonal cross-sectional shape is defined in an outer surface of the first connector, wherein the coupling hole is disposed in the seating groove, wherein the second connector comprises:

a polyprismatic portion having a polygonal cross-sectional shape corresponding to the seating groove; and an insertion portion extending from the polyprismatic portion, wherein the polyprismatic portion of one battery module is seated in the seating groove of another battery module, and wherein the insertion portion of the one battery module is inserted into the coupling hole of the another battery module.

2. The battery module of claim 1, wherein each of the plurality of pipe members extends perpendicularly to the first wall and the second wall.

3. The battery module of claim 1, wherein an internal space of each of the plurality of pipe members is isolated from the flow space for the heat exchange medium.

4. The battery module of claim 1, wherein the first sidewall and the second sidewall are disposed to face each other.

5. The battery module of claim 1, wherein a sealing member is coupled to an inner peripheral surface of the coupling hole.

6. A battery module of claim 1, comprising:

a heat exchanger including:

a first wall having a plurality of first through-holes, a second wall having a plurality of second through-holes corresponding to the plurality of first through-holes, a plurality of pipe members configured to connect the plurality of first through-holes and the plurality of second through-holes in a one-to-one manner, and a plurality of sidewalls configured to connect the first wall and the second wall to define a flow space for a heat exchange medium that adjoins the plurality of pipe members, wherein a first sidewall, among the plurality of sidewalls, has an inlet port into which the heat exchange medium is introduced, and a second sidewall, among the plurality of sidewalls, has an outlet port from which the heat exchange medium is discharged;

a plurality of battery cells respectively inserted into the plurality of pipe members;

a first busbar assembly coupled to a lower portion of the heat exchanger and configured to support the plurality of battery cells, the first busbar assembly having a plurality of first terminals being in contact with lower end electrodes of the plurality of battery cells; and a second busbar assembly coupled to an upper portion of the heat exchanger and having a plurality of second terminals being in contact with upper end electrodes of the plurality of battery cells, wherein the first busbar assembly comprises:

a base plate having the plurality of first terminals; and a first battery cell support member disposed on the base plate and having a plurality of third through-holes into which the plurality of battery cells is inserted.

7. A battery module comprising:

a heat exchanger including:

a first wall having a plurality of first through-holes, a second wall having a plurality of second through-holes corresponding to the plurality of first through-holes, a plurality of pipe members configured to connect the plurality of first through-holes and the plurality of second through-holes in a one-to-one manner, and a plurality of sidewalls configured to connect the first wall and the second wall to define a flow space for a heat exchange medium that adjoins the plurality of pipe members, wherein a first sidewall, among the plurality of sidewalls, has an inlet port into which the heat exchange medium is introduced, and a second sidewall, among the plurality of sidewalls, has an outlet port from which the heat exchange medium is discharged;

a plurality of battery cells respectively inserted into the plurality of pipe members;

a first busbar assembly coupled to a lower portion of the heat exchanger and configured to support the plurality of battery cells, the first busbar assembly having a plurality of first terminals being in contact with lower end electrodes of the plurality of battery cells; and a second busbar assembly coupled to an upper portion of the heat exchanger and having a plurality of second terminals being in contact with upper end electrodes of the plurality of battery cells, wherein the second busbar assembly comprises:

a second battery cell support member having a plurality of fourth through-holes into which the plurality of battery cells is inserted; and a cover plate disposed on the second battery cell support member and having the plurality of second terminals.

\* \* \* \* \*